United States Patent [19]

Childs et al.

[11] Patent Number: 4,461,644

[45] Date of Patent: Jul. 24, 1984

[54] LIGHT WEIGHT COMPOSITION AND A METHOD OF SEALING A SUBTERRANEAN FORMATION

[75] Inventors: Jerry D. Childs, Duncan; Lance E. Brothers, Lawton; Joseph R. Murphey, Duncan, all of Okla.

[73] Assignee: Halliburton Company, Duncan, Okla.

[21] Appl. No.: 490,089

[22] Filed: Apr. 29, 1983

[51] Int. Cl.$^3$ ................................................ C04B 7/35
[52] U.S. Cl. ...................................... 106/76; 106/89; 106/90; 166/293
[58] Field of Search ............................ 106/76, 89, 90; 166/293

[56] References Cited

U.S. PATENT DOCUMENTS

| | | | |
|---|---|---|---|
| 2,336,723 | 12/1943 | Drummond | 106/76 |
| 2,393,597 | 1/1946 | Drummond | 106/314 |
| 3,787,558 | 1/1974 | Briggs et al. | 423/164 |
| 3,835,926 | 9/1974 | Clement, Jr. | 106/76 |
| 3,928,052 | 12/1975 | Clement, Jr. | 106/76 |
| 4,089,376 | 5/1978 | Messenger | 106/90 |
| 4,115,219 | 9/1978 | Gancy et al. | 204/99 |
| 4,229,222 | 10/1980 | Schneider | 106/74 |

*Primary Examiner*—James Poer
*Attorney, Agent, or Firm*—Thomas R. Weaver; Edward F. Sherer

[57] ABSTRACT

A light weight cement composition made from sea water and a method of sealing a subterranean formation utilizing the light weight cement composition. The light weight cement composition comprises a hydraulic cement, a silicate compound, sea water and a hydroxide compound. The method comprises introducing the light weight cement composition into the subterranean formation.

20 Claims, No Drawings

LIGHT WEIGHT COMPOSITION AND A METHOD OF SEALING A SUBTERRANEAN FORMATION

BACKGROUND OF THE INVENTION

1. Field of the Invention

The present invention relates to a light weight cement composition made from sea water which is used in sealing or cementing subterranean zones penetrated by a well bore, such as cementing the annular space between an oil and/or gas well casing and the surrounding formation.

2. Description of the Prior Art

In the production of hydrocarbons from the subterranean formation, the subterranean formation is typically cemented or sealed by pumping an aqueous hydraulic cement slurry into the annulus between the pipe and the formation. In the oft practiced placement of cement in the annular space between the casing of an oil well and the surrounding subterranean environment, the cement slurry is commonly pumped down inside the casing and back up the annular space surrounding the casing. Occasionally, the cement is introduced directly into the annular space at the outer side of the casing. Where the cement has been pumped down the casing initially, any cement slurry which remains in the casing is displaced into the annulus by a suitable fluid or fluids.

During cementing operations where fresh water is either unavailable or expensive, sea water is often utilized to make the cement slurry used in the cementing operation.

When sea water is used in the preparation of a cement slurry, certain detrimental effects can occur. For example, cement slurries containing sea water generally require large concentrations of retarders, dispersants, and fluid loss additives to achieve the same performance observed in corresponding fresh water slurries. Furthermore, when sea water is utilized in the preparation of a light weight cement slurry, soluble silicates can be used to suspend the solids of the cement in the presence of the excess sea water. In light weight sea water slurries, a large concentration of the silicate is required. This increase in the required soluble silicate level shortens the pumping time of the cement slurry even in the presence of a cement set retarder and can prevent the slurry from remaining fluid for the time necessary to place it in the well bore annulus. If the amount of silicate is reduced to the level which will allow it to remain fluid for extended periods of time at elevated temperatures, the sea water will cause the slurry to settle after it is placed in the well bore annulus. This results in intervals of water in the annular space between the casing and the formation rather than a competent cement slurry of uniform density. Thus, in conventional cementing applications, a compromise between the concentrations of added soluble silicate and cement set retarder is required in order to minimize settling while still yielding a slurry with adequate pumping time. Without corrective measures, this compromise is difficult, if not impossible to achieve.

In general for all cement slurries, it is believed that the difficulty of using sea water to form a cement slurry is due to magnesium ions which are present in the sea water, but it is to be expressly understood that the invention herein shall not be unduly limited by this proposed theory whether or not it be correct. It has been found that sea water can contain from about 1000 to about 1700 ppm of magnesium compounds (calculated as elemental magnesium). When water containing magnesium ions is utilized to form a cement slurry, it is believed that the magnesium ions are precipitated through a reaction with hydroxide compounds released in the initial hydration of the cement components. The decrease in hydroxide concentration may alter the solubility of the various components dissolved in the aqueous phase of the cement slurry, especially in the immediate vicinity of the hydrating cement particle and this, in turn, may alter the type, rate, and extent of the initial hydration reactions of the cement particles in such a manner that substantial gellation or premature settling of the cement slurry occurs. An alternative or additional theory for the detrimental effect of magnesium ions when present in cement slurries, is that precipitated magnesium hydroxide initially possesses an extremely large active surface area and that various components of the cement slurry, are absorbed onto the surface of the precipitated magnesium hydroxide and are effectively removed from solution.

These theories are put forth in order to explain the influence of sea water on the response of cement slurries in general. For light weight cement slurries prepared with soluble silicates and sea water, an additional phenomena is involved. The field preparation of such slurries normally involves the addition of the soluble silicate to the sea water prior to the addition of the hydraulic cement. Since the sea water contains both magnesium ions and calcium ions and since the pH of the sea water is low relative to the soluble silicate, a sizable portion of the silicate, which is added to the sea water, is removed from solution through the precipitation as magnesium or calcium silicates and/or by the insolubilization of the silicate due to the relatively low pH of the sea water. These reactions require an increase in the level of soluble silicate because of the silicate which was removed from solution by the sea water. Unfortunately, the precipitated and insolubilized silicates are still active with regard to their influence on the response of the cement slurry and require the addition of larger amounts of cement set retarders in order to achieve the pumping times of corresponding fresh water slurries. Unfortunately, the increases in cement retarder concentration and type of retarder required in such a situation tends to negate the suspending properties of the soluble silicates. Thus, it is often difficult, if not impossible, to arrive at concentrations of cement set retarder and soluble silicates which effectively compromise the pumping time and particle settlement requirements for many applications.

The present invention is a light weight cement composition containing silicate and made from sea water, a method of preparing the cement composition, and a method of sealing or cementing a subterranean formation using the cement composition which overcomes or at least mitigates the above-described problems.

SUMMARY OF THE INVENTION

The present invention is a cement composition made from sea water and containing silicate, a method of preparing the cement composition, and a method of utilizing the cement composition for sealing or cementing a subterranean formation. The cement composition of the present invention has reduced amounts of silicate but has reduced settling and therefore maintains a uniform density in the annular space between the casing and the formation while still allowing for adequate placement time. The cement composition comprises a hydraulic cement, a silicate compound selected from the group consisting of an aqueous alkali metal silicate, an aqueous ammonium silicate and mixtures thereof said aqueous silicate being present in the range of from about 0.40 percent to about 3.40 percent by weight of the hydraulic cement, sea water present in an amount of from about 42 percent to about 190 percent by weight of the hydraulic cement, and a hydroxide compound selected from the group consisting of an alkali metal hydroxide, ammonium hydroxide, calcium hydroxide, and mixtures thereof and present in the range of from about 0.2 percent to about 2.0 percent by weight of the sea water. Optionally, the cement composition may contain a cement set retarder. The cement composition is formulated so that the composition has a density of about 11.0 to about 16.0 pounds per gallon.

Other additives well known in the art such as retarders, corrosion inhibitors, fluid loss additives, freezing point depressants, and the like may be employed in the cement composition in an amount which is functionally sufficient to provide the desired characteristics. The method is carried out by introducing the above-described composition into a subterranean formation.

DETAILED DESCRIPTION OF THE INVENTION

The term "hydraulic cement" as used herein refers to those inorganic materials which set up to a hard monolithic mass under water. Generally, any hydraulic cement can be used in the cement composition of the present invention. Portland cement is generally preferred because of its low cost, availability, and general utility, but other cements such as pozzolan cements, gypsum cements and high alumina content cements may be used in the invention. Portland cements of API Classes A, H, and G are the most preferred cements for use in the invention in most instances, although the other API Classes of cements may be utilized. The characteristics of these cements is described in API Specification For Materials and Testing for Well Cements, API Spec 10 A, First Edition, Jan., 1982, which is incorporated herein by reference.

A wide variety of silicate compounds can be utilized in the cement composition of the present invention. For instance, sodium, ammonium, potassium, lithium, rubidium, and cesium silicate can be utilized. A particularly preferred silicate compound useful in the invention as a molar ratio of silicon dioxide to metal oxide in the range of from about 1.5:2 to about 3.3:1 wherein the metal is selected from the group consisting of sodium, potassium, and mixtures thereof. The preferred ratio of silicon dioxide to alkali metal oxide is maintained at a ratio of about 3.22:1 and is sold under the name of Diamond Shamrock Grade 40.

The amount of silicate compound used in the present invention will vary, but generally will be in the range of from about 0.40 percent to about 3.40 percent by weight of the hydraulic cement. The preferred amount of silicate compound used in the cement composition of the present invention is about 0.80 percent to about 2.30 percent by weight of the hydraulic cement.

A variety of hydroxide compounds can be employed in the cement composition of the present invention. It is believed that the hydroxide compounds function to precipitate the magnesium ions which are present in the sea water and to raise the pH of the sea water. Examples of hydroxides which can be utilized are alkali metal hydroxides such as sodium hydroxide and potassium hydroxide and hydroxides such as calcium hydroxide and ammonium hydroxide.

The preferred hydroxide compound for use in the present invention is sodium hydroxide. This treatment results in the removal of magnesium ions by precipitation of the magnesium ions as insoluble magnesium hydroxide through the following reaction:

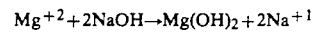

$$Mg^{+2} + 2NaOH \rightarrow Mg(OH)_2 + 2Na^{+1}$$

The removal of the magnesium ion from the sea water greatly eliminates the detrimental effects of sea water on the cement slurries in general and conditions the sea water prior to the addition of soluble silicates when preparing the light weight cement slurries in particular.

The quantity of hydroxide employed in the present invention will vary over a wide range depending upon the amount of sea water used to prepare the cement composition of the present invention. Generally, however, the amount of hydroxide present will be in the range of from about 0.2 percent to about 2.0 percent by weight of the sea water. Preferably the hydroxide is added in an amount that raises the pH of the sea water to at least 12 and is at least stoichiometric to the amount of magnesium that is present in the sea water.

The light weight cement compositions of the present invention are made up of sea water. The amount of sea water used in the cement composition of the present invention will vary over a wide range depending on the desired density of the cement composition and the amount of hydraulic cement and silicate compound used in the cement composition. Generally, the amount of sea water present in the cement composition will be in the range of from about 42 percent to about 190 percent by weight of the hydraulic cement with about 73 percent to about 170 percent by weight of hydraulic cement being the preferred range.

The light weight cement compositions of the present invention are preferably prepared by adding the hydroxide compound to the sea water before the hydraulic cement or silicate compound is added to sea water. The silicate compound is then added to the sea water which contains the hydroxide compound. Next, the hydraulic cement is added to the mixture containing the sea water, the silicate compound, and the hydroxide compound.

A particularly preferred method of preparing the cement composition of the present invention comprises adding the desired amount of the hydroxide compound, preferably 50 percent by weight of aqueous sodium hydroxide, to the aqueous silicate compound, preferably 63 percent by weight of aqueous sodium silicate to form a mixture. The mixture is then added to sea water and subsequently the hydraulic cement is then added to the mixture.

In those instances were the cementing operation is carried out at over about 100° F., it is desirable that a cement set retarder be included in the cement composition. It is also preferable that the cement set retarder be added to the sea water prior to the addition of the hydroxide compound, silicate compound, or hydraulic cement. The hydroxide compound may also be incorporated into the cement set retarder.

The concentrations of the compounds used to prepare the cement composition are correlated to achieve the density desired in the cement composition. The preferred density of the cement is about 11.4 pounds to 14.0 pounds per gallon.

In using the cement compositions of the present invention for sealing a subterranean formation, a specific quantity of the cement composition is prepared and introduced through the well bore into the formation to be sealed. As the cement slurry enters the formation, it reaches a static condition and sets into a high strength composition.

In carrying out squeeze cementing operations such as sealing a zone of lost circulation or shutting off a water producing formation, the introduction of the cement composition into the formation may be hesitated at intervals so that the portions of the cement composition already in the formation are allowed to start to set before being displaced by additional incoming cement.

A retarder is preferably used when the bottom hole circulating temperature exceeds about 100° F. Retarders satisfactory for use in the invention include those commercially available products commonly employed as retarders. Examples of retarders which can be used to carry out the invention include lignosulfonates, such as calcium lignosulfonate and sodium lignosulfonate, organic acids such as tartaric acid and gluconic acid and mixtures thereof. The amount of retarder required will vary according to the bottom hole circulating temperature and variations in the makeup of the cement itself. The proper amount of retarder required in any particular case should be determined by running a "thickening time" test for the particular concentration of retarder and cement composition being used. Such tests should be run according to the procedures set by API SPEC 10. Generally speaking, "thickening time" is defined in API SPEC 10 as the elapsed time from the time pumping begins until the cement reaches from about 70 to about 100 units of consistency. In most applications the amount of retarder, if any, required will not exceed more than about 4.0 percent by weight of the cement composition.

In some cases, fluid loss control of the slurry can be achieved by extrinsic conditions existing in the borehole prior to and during the cementing operation. In other instances, a fluid loss control additive is suitable for use in the cement composition of the invention. Some well known types of fluid loss additives are cellulose derivatives, such as carboxymethylhydroxyethyl cellulose and hydroxyethyl cellulose, lignin, lignosulfonates, polyacrylamides, modified polysaccharides, polyaromatic sulfonates and guar gum derivatives or mixtures of two or more of the foregoing. A preferred fluid loss material used in the cement composition is a commercially available blend or mixture of a cellulose derivative or modified polysaccharide with a dispersant constituted by a polymeric aromatic sulfonate. In general, where fluid loss additives are used to provide the necessary fluid loss reduction, an amount of from about 0.05 to about 3.0 weight percent based on cement is used.

Dispersing agents can be utilized in the cement composition of the present invention although the use of such compounds in light weight cement slurries is generally not required. Friction reducers which promote freer movement of the unset composition, and allow ease of pumping through the annulus, can be incorporated into the cement composition in amounts up to about 2.0 percent by weight of dry cement composition. Some dual function additives, such as lignosulfonates which function both as a dispersant and also as a set time retarder, can be incorporated into the cement composition where their use would be advantageous in certain cementing situations.

Various types of fine aggregate or particular filler materials such as fly ash, silica flour, fine sand, diatomaceous earth, light weight aggregate in hollow spheres can be incorporated in the cement composition of the present invention. The use of these materials is well understood in the art and so long as they are compatible with the cement composition of the invention, they can be employed over wide ranges of concentration.

A preferred cement for use in the cement composition disclosed herein comprises API Class G Portland cement, sea water, sodium hydroxide present in an amount that raises the pH of the sea water to at least 12 and is at least stoichiometric to the amount of magnesium present in the sea water, sodium silicate, and sodium lignosulfonate. The amount of the above-described components is adjusted to the desired density for the composition.

In order to further illustrate the invention and present a clear understanding thereof, the following examples are given.

EXAMPLE I

Tests were conducted in the laboratory of the type described in the American Petroleum Institute publication entitled "API Specification for Material and Testing for Well Cements" (API SPEC 10, 1st Ed., Jan., 1982). The thickening time test apparatus included a rotating cylindrical slurry container equipped with a stationary paddle assembly, all enclosed in a pressure chamber capable of withstanding the conditions of the test.

Various cement slurries of the present invention were prepared by mixing either sodium silicate or potassium silicate with sea water to form a mixture having a density of 11.5 lb/gal. The mixture was added to Blue Circle Class G Portland cement to form a cement slurry. The amount of free water in the cement slurry was measured to determine the settling properties of the cement slurry. The results of these tests are shown in Table I.

TABLE I

| | | Components Added To Portland Cement To Form Cement Slurry | | | |
|---|---|---|---|---|---|
| Test No. | Silicate Used | Quantity of Silicate used (gals/94 lb. sack of cement) | Water Used | 50% by weight Aqueous NaOH Used (gal/bbl of sea water) | Free water of slurry (% by volume) |
| 1 | Sodium[1] Silicate | 0.2 | sea | — | 30.0 |
| 2 | Sodium[1] Silicate | 0.3 | sea | — | 20.0 |
| 3 | Sodium[1] Silicate | 0.4 | sea | — | 5.4 |
| 4 | Sodium[1] Silicate | 0.5 | sea | — | 1.2 |

TABLE I-continued

| | | Components Added To Portland Cement To Form Cement Slurry | | | |
|---|---|---|---|---|---|
| Test No. | Silicate Used | Quantity of Silicate used (gals/94 lb. sack of cement) | Water Used | 50% by weight Aqueous NaOH Used (gal/bbl of sea water) | Free water of slurry (% by volume) |
| 5 | Sodium[1] Silicate | 0.6 | sea | — | 0.4 |
| 6 | Sodium[1] Silicate | 0.7 | sea | — | 0.0 |
| 7 | Potassium[2] Silicate | 0.2 | sea | — | 25.0 |
| 8 | Potassium[2] Silicate | 0.3 | sea | — | 5.6 |
| 9 | Potassium[2] Silicate | 0.4 | sea | — | 3.3 |
| 10 | Potassium[2] Silicate | 0.5 | sea | — | 0.9 |
| 11 | Potassium[2] Silicate | 0.6 | sea | — | 0.7 |
| 12 | Potassium[2] Silicate | 0.7 | sea | — | 0.0 |
| 13 | Sodium[1] Silicate | 0.2 | sea | 0.27 | 2.5 |
| 14 | Sodium[1] Silicate | 0.3 | sea | 0.27 | 1.4 |
| 15 | Sodium[1] Silicate | 0.4 | sea | 0.27 | 0.9 |
| 16 | Sodium[1] Silicate | 0.5 | sea | 0.27 | 0.7 |
| 17 | Sodium[1] Silicate | 0.6 | sea | 0.27 | 0.4 |
| 18 | Sodium[1] Silicate | 0.7 | sea | 0.27 | 0.2 |
| 19 | Potassium[2] Silicate | 0.2 | sea | 0.27 | 3.1 |
| 20 | Potassium[2] Silicate | 0.3 | sea | 0.27 | 1.8 |
| 21 | Potassium[2] Silicate | 0.4 | sea | 0.27 | 1.3 |
| 22 | Potassium[2] Silicate | 0.5 | sea | 0.27 | 0.7 |
| 23 | Potassium[2] Silicate | 0.6 | sea | 0.27 | 0.6 |
| 24 | Potassium[2] Silicate | 0.7 | sea | 0.27 | 0.8 |

[1]Aqueous solution $SiO_2:Na_2O$ = 3.22 molar ratio, 38.3 percent by weight solids with specific gravity at 20° C. of 1.401.
[2]Aqueous solution $SiO_2:K_2O$ = 2.54 molar ratio, 46.7 percent by weight solids with specific gravity at 20° C. of 1.5.

The results of these tests show that the use of sodium hydroxide in sea water produced a light weight cement slurry having less free water at minimal silicate concentrations than the slurries made from sea water and not having sodium hydroxide. The lower amount of free water produced a cement of uniform consistency and no settling.

Tests were carried out wherein the order of mixing the components to form the cement slurry was compared to thickening time. The tests were carried out in accordance with the procedures of API Spec 10, First Edition, Jan., 1982. The order of which the components were placed in the sea water is shown in parenthesis. The information concerning the various compositions tested and the thickening time and free water data relating thereto are set forth in Table II.

TABLE II

| Test No. | Slurry Density (lb/gal) | Retarder (gal/94 lb. sack of cement) | Liquid* Sodium Silicate (gal/bbl) | 50% by weight Aqueous NaOH Used (gal/bbl of sea water) | Thickening Time (Hours:Minutes) (temp.) | Free Water (%) by volume |
|---|---|---|---|---|---|---|
| 1 | 11.5 | 1.0% calcium lignosulfonate (1) | 1 (3) | 0.35 (2) | 1:45 (184° F.) | — |
| 2 | 11.5 | 1.0% calcium lignosulfonate (3) | 1 (2) | 0.27 (1) | 6:45+(184° F.)** | — |
| 3 | 11.5 | 0.4 sodium lignosulfonate (1) | 1 (3) | 0.27 (2) | 1:03 (184° F.) | — |
| 4 | 11.5 | 0.8 sodium lignosulfonate (1) | 1 (3) | 0.27 (2) | 2:10 (184° F.) | — |
| 5 | 11.5 | 0.5 sodium lignosulfonate (1) | 0.5 (3) | 0.27 (2) | 4:27 (184° F.) | 0.6 |
| 6 | 12.0 | 0.5 sodium lignosulfonate (1) | 0.5 (3) | 0.27 (2) | 5:23 (184° F.) | 0.4 |
| 7 | 11.5 | 0.5 sodium lignosulfonate (3) | 0.5 (2) | 0.27 (1) | — | 4.9 |
| 8 | 11.5 | 0.5 sodium | 0.5 (3) | 0.27 (1) | — | 7.2 |

TABLE II-continued

| Test No. | Slurry Density (lb/gal) | Retarder (gal/94 lb. sack of cement) | Liquid* Sodium Silicate (gal/bbl) | 50% by weight Aqueous NaOH Used (gal/bbl of sea water) | Thickening Time (Hours:Minutes) (temp.) | Free Water (%) by volume |
|---|---|---|---|---|---|---|
| 9 | 11.5 | lignosulfonate (2) 0.5 sodium lignosulfonate (1) | 0.5 (3) | 0.27 (2) | 4:16 (156° F.) | 0.6 |
| 10 | 12.0 | 0.5 sodium lignosulfonate (1) | 0.5 (3) | 0.27 (2) | 4:52 (156° F.) | 0.4 |
| 11 | 11.5 | 0.6 sodium lignosulfonate (1) | 0.5 (3) | 0.27 (2) | 4:37 (215° F.) | 0.7 |
| 12 | 12.0 | 0.5 sodium lignosulfonate (1) | 0.5 (3) | 0.27 (2) | 4:45 (215° F.) | 0.4 |

*Same composition as Table I.
**Settling of the cement slurry made determination of the thickening time meaningless. Test was terminated after 6 hours, 45 minutes.

It will be understood by those skilled in the art that considerable variation in the components of the cement compositions of the present invention as well as the methods of using the compositions can be made and this invention is not limited to the specific examples which are given herein for the purpose of disclosure.

We claim:

1. A cement composition having a density of from about 11.0 to about 16.0 pounds and comprising:
   (a) a hydraulic cement;
   (b) a silicate compound selected from the group consisting of an aqueous alkali metal silicate, an aqueous ammonium silicate and mixtures thereof said compound being present in the range of from about 0.40 percent to about 3.40 percent by weight of hydraulic cement;
   (c) sea water present in the range of from about 42 percent to about 190 percent by weight of hydraulic cement; and
   (d) a hydroxide compound selected from the group consisting of an alkali metal hydroxide, ammonium hydroxide, calcium hydroxide, and mixtures thereof said hydroxide compound present in the range of from about 0.2 percent to about 2.0 percent by weight of the sea water;
wherein said hydroxide compound is added to the sea water before the silicate compound and the hydraulic cement is added to the sea water.

2. The composition recited in claim 1 wherein said composition further comprises a cement set retarder.

3. The composition recited in claim 2 wherein said silicate is an alkali metal silicate and has a molar ratio of silicon dioxide to alkali metal oxide in the range of from about 1.5:2 to about 3.3:1 and the alkali metal is selected from the group consisting of potassium, sodium, and mixtures thereof.

4. The composition recited in claim 3 wherein said silicate has a molar ratio of silicon dioxide to alkali metal oxide of about 3.22:1.

5. The composition recited in claim 1 wherein a mixture of said silicate composition and said hydroxide compound is added to the sea water before the hydraulic cement is added to the sea water.

6. The composition recited in claim 3 wherein said hydroxide is sodium hydroxide.

7. The composition recited in claim 2 wherein said cement set retarder is sodium lignosulfonate.

8. The composition recited in claim 2 wherein the density of said cement composition is about 11.4 pounds to about 14.0 pounds per gallon.

9. The composition recited in claim 8 wherein said sea water is present in the range of about 73 percent to about 170 percent by weight of hydraulic cement.

10. The composition recited in claim 9 wherein said sodium hydroxide is present in an amount that raises the pH of the sea water to at least 12 and is at least stoichiometric to the amount of magnesium present in the sea water.

11. A method of cementing a subterranean earth formation comprising:
   (I) introducing a cement composition having a density of from about 11 to about 16 pounds per gallon into said formation the cement composition comprising:
      (a) a hydraulic cement;
      (b) a silicate compound selected from the group consisting of an aqueous alkali metal silicate, an aqueous ammonium silicate and mixtures thereof said compound being present in the range of from about 0.40 percent to about 3.40 percent by weight of hydraulic cement;
      (c) sea water present in the range of from about 42 percent to about 190 percent by weight of hydraulic cement; and
      (d) a hydroxide compound selected from the group consisting of an alkali metal hydroxide, ammonium hydroxide, calcium hydroxide, and mixtures thereof said hydroxide compound present in the range of from about 0.2 percent to about 2.0 percent by weight of the sea water;
wherein said hydroxide compound is added to the sea water before the silicate compound and the hydraulic cement is added to the sea water.

12. The method recited in claim 11 wherein said composition further comprises a cement set retarder.

13. The method recited in claim 12 wherein said silicate is an alkali metal silicate and has a molar ratio of silicon dioxide to alkali metal oxide in the range of from about 1.5:2 to about 3.3:1 and the alkali metal is selected from the group consisting of potassium, sodium, and mixtures thereof.

14. The method recited in claim 13 wherein said silicate has a molar ratio of silicon dioxide to alkali metal oxide of about 3.22:1.

15. The method recited in claim 13 wherein said hydraulic cement is API Class G Portland cement.

16. The method recited in claim 13 wherein said hydroxide is sodium hydroxide.

17. The method recited in claim 12 wherein said retarder is sodium lignosulfonate.

18. The method recited in claim 12 wherein the density of said cement composition is about 11.4 to about 14 pounds per gallon.

19. The method recited in claim 18 wherein said sea water is present in the range of about 73 percent to about 170 percent by weight of hydraulic cement.

20. The method recited in claim 19 wherein said sodium hydroxide is present in an amount that raises the pH of the sea water to at least 12 and is at least stoichiometric to the amount of magnesium present in the sea water.

* * * * *